United States Patent
Cho et al.

(10) Patent No.: US 10,487,185 B2
(45) Date of Patent: Nov. 26, 2019

(54) ACCELERATING METHOD OF SELF-HEALING FOR SCRATCHES

(71) Applicant: SAMSUNG ELECTRONICS CO., LTD., Suwon-si, Gyeonggi-do (KR)

(72) Inventors: Chung Kun Cho, Suwon-si (KR); Mikhail Kovalev, Suwon-si (KR); Ginam Kim, Seongnam-si (KR); Nobuji Sakai, Yokohama (JP); Myung Man Kim, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 104 days.

(21) Appl. No.: 15/894,364

(22) Filed: Feb. 12, 2018

(65) Prior Publication Data

US 2018/0237604 A1 Aug. 23, 2018

(30) Foreign Application Priority Data

Feb. 21, 2017 (KR) .................. 10-2017-0023162

(51) Int. Cl.
| | |
|---|---|
| *C08J 7/02* | (2006.01) |
| *C08G 18/42* | (2006.01) |
| *C08G 18/75* | (2006.01) |
| *C09D 175/16* | (2006.01) |
| *C08G 18/36* | (2006.01) |
| *C08G 18/32* | (2006.01) |
| *C08G 18/66* | (2006.01) |
| *C09D 4/00* | (2006.01) |
| *C08K 5/549* | (2006.01) |

(52) U.S. Cl.
CPC ............ *C08J 7/02* (2013.01); *C08G 18/3206* (2013.01); *C08G 18/36* (2013.01); *C08G 18/4277* (2013.01); *C08G 18/664* (2013.01); *C08G 18/6662* (2013.01); *C08G 18/755* (2013.01); *C09D 4/00* (2013.01); *C09D 175/16* (2013.01); *C08J 2375/16* (2013.01); *C08K 5/549* (2013.01)

(58) Field of Classification Search
CPC . C08J 7/02; C08L 75/04; C08G 18/82; C09D 175/14
See application file for complete search history.

(56) References Cited

U.S. PATENT DOCUMENTS

| | | |
|---|---|---|
| 7,555,182 B2 | 6/2009 | Martin |
| 7,666,503 B2 | 2/2010 | Easter |
| 9,281,102 B2 | 3/2016 | Molvig-Lundegaard et al. |
| 2007/0004817 A1* | 1/2007 | Hara ................ C08F 283/006 522/90 |

FOREIGN PATENT DOCUMENTS

| | | |
|---|---|---|
| JP | 6128398 A | 5/1994 |
| JP | 7334871 A | 12/1995 |
| JP | 2010106929 A | 5/2010 |
| KR | 101459638 B1 | 11/2014 |

OTHER PUBLICATIONS

B.J. Blaiszik, et al., "Self-Healing Polymers and Composites", Annu. Rev. Matter. Res. 2010, 179-211.
Dong Yang Wu, et al., "Self-healing polymeric materials: A review of recent developments", Prog. Polym. Sci. 33 (2008) 479-522.
Masayuki Yamaguchi, et al., "Interdiffusion of dangling chains in weak gel and its application to self-repairing material", Materials Science and Engineering B 162 (2009) 189-194.
Masayuki Yamaguchi, et al., "Self-repairing property of polymer network with dangling chains", Materials Letters 61 (2007)1396-1399.
Nabarun Roy, et al., "Dynamers: dynamic polymers as self-healing materials", Chem. Soc. Rev., 2015, 44, 3786.
Santiago J. Garcia, "Effect of polymer architecture on the intrinsic self-healing character of polymers", European Polymer Journal 53 (2014) 118-125.

* cited by examiner

*Primary Examiner* — Kuo Liang Peng
(74) *Attorney, Agent, or Firm* — Cantor Colburn LLP

(57) ABSTRACT

A method of accelerating self-healing includes contacting a scratched portion of a self-healing urethane(meth)acrylate-derived material with a plasticizing solvent, wherein the plasticizing solvent comprises water, an alcohol, a ketone, or a combination thereof.

20 Claims, 5 Drawing Sheets

ACCELERATING METHOD OF SELF-HEALING FOR SCRATCHES

CROSS-REFERENCE TO RELATED APPLICATION

This application claims priority to and the benefit of Korean Patent Application No. 10-2017-0023162, filed in the Korean Intellectual Property Office on Feb. 21, 2017, and all the benefits accruing therefrom under 35 U.S.C. § 119, the content of which in its entirety is herein incorporated by reference.

BACKGROUND

1. Field

A method for accelerating self-healing of scratches is disclosed.

2. Description of the Related Art

A thin and light display material and use of such for a portable electronic device, such as a smart phone or a tablet PC, are increasingly in demand. A tempered glass having satisfactory mechanical characteristics may be applied on the front screen of a portable electronic device to protect the portable electronic device from damage. However, the tempered glass is heavy and easily broken by an external impact and thus has a limit in application to the portable electronic device. In particular, the tempered glass has no flexibility which makes it difficult to apply the material to a flexible display.

It is thus desirable to provide a protective material which can be easily applied to a flexible display.

SUMMARY

Disclosed is a method of accelerating self-healing of scratches in a polyurethane-derived material, and a method in which the self-healing of scratches is easily and simply accelerated by an average consumer.

In an embodiment, a method of accelerating self-healing includes contacting a scratched portion of self-healing urethane(meth)acrylate-derived material with a plasticizing solvent. The plasticizing solvent may include water, an alcohol, a ketone, or a combination thereof.

The contacting of the scratched portion of the self-healing urethane(meth)acrylate-derived material with the plasticizing solvent may include, dripping the plasticizing solvent on the scratched portion, attaching a material in which the plasticizing solution is absorbed to the scratched portion, or dipping the scratched portion in the plasticizing solvent.

A scratch in the scratched portion may be self-healed in about 10 seconds to about 72 hours.

The method may include contacting the scratched portion of the self-healing urethane(meth)acrylate-derived material with the plasticizing solvent for about 10 seconds or longer.

The method may further include removing the plasticizing solvent remaining in the scratched portion after contacting the scratched portion of the self-healing urethane(meth)acrylate-derived material with the plasticizing solvent.

A scratch in the scratched portion may be self-healed in less than or equal to about 12 hours after removing the plasticizing solvent.

The scratch may be formed by a pencil having a hardness of 4B to 9H at a load of 1 kilogram-force (kgf).

The self-healing urethane(meth)acrylate-derived material may be a cured product of a self-healing composition including a urethane(meth)acrylate compound.

The urethane(meth)acrylate compound may have two (meth)acrylate groups and six or more urethane groups.

The urethane(meth)acrylate compound may be a reaction product of a C1 to C20 aliphatic diisocyanate, a C1 to C100 aliphatic diol, and a C1 to C20 hydroxyalkyl(meth)acrylate.

The urethane(meth)acrylate compound may be represented by Chemical Formula 1.

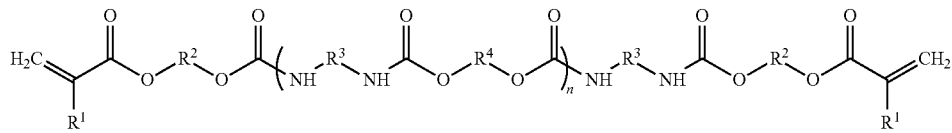

Chemical Formula 1

In Chemical Formula 1, n is a numeral of 2 to 30 and $R^1$ is hydrogen or a methyl group, $R^2$ and $R^3$ are each independently a substituted or unsubstituted C1 to C20 alkylene group, or a substituted or unsubstituted C3 to C20 cycloalkylene group, $R^4$ is a substituted or unsubstituted C1 to O10 alkylene or a C2 to C100 divalent aliphatic organic group including an ether group, an ester group, or a combination thereof.

The self-healing composition may further include a polyhedral oligomeric silsesquioxane (POSS).

The polyhedral oligomeric silsesquioxane may be a polyhedral oligomeric silsesquioxane substituted with a phenyl group.

The polyhedral oligomeric silsesquioxane may be in an amount of about 0.1 weight percent (wt %) to about 20 wt %, based on a total solid content of the self-healing composition.

The self-healing urethane(meth)acrylate-derived material may be in a film form.

The film may have a thickness of about 10 micrometers (μm) to about 500 μm.

The self-healing urethane(meth)acrylate-derived material may be a protective film disposed on a surface of a device.

The self-healing urethane(meth)acrylate-derived material may be a protective film disposed on a surface of a device and includes an anti-fingerprinting coating layer disposed on at least one surface of the protective film.

The self-healing urethane(meth)acrylate-derived material may have a light transmittance of greater than or equal to about 80%, a yellowness index of less than or equal to about 3, and a haze of less than or equal to about 5%.

The self-healing urethane(meth)acrylate-derived material may be a protective film on a surface of a window of a flexible display device.

The self-healing accelerating method according to an embodiment is an economical and simple method that is easily implemented by an average consumer.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
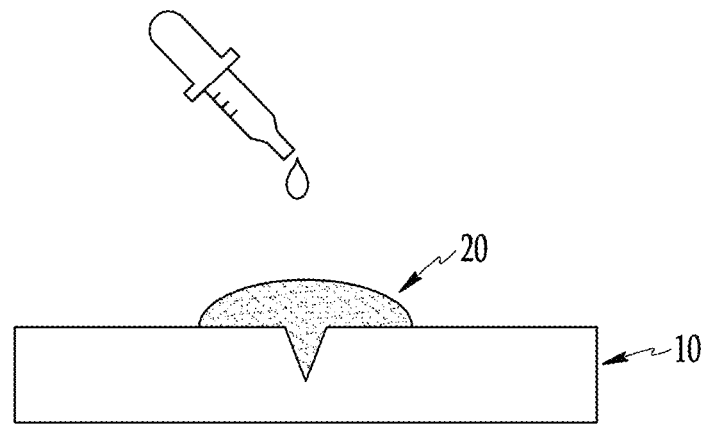
FIGS. 1 to 3 are schematic views illustrating a method of contacting a plasticizing solvent with a scratched portion of a self-healing urethane(meth)acrylate-derived material, according to example embodiments.

Hereinafter, example embodiments will hereinafter be described in detail, and may be easily realized by a person skilled in the art. However, this disclosure may be embodied in many different forms and is not to be construed as limited to the example embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10% or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, unless otherwise indicated, "substituted" means that the compound or group is substituted with at least one (e.g., 1, 2, 3, or 4) substituent selected from a 01 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (F, C1, Br, or I), a hydroxy group (—OH), a nitro group (—NO$_2$), a cyano group (—CN), an amino group (—NRR' wherein R and R' are independently hydrogen or C1 to C6 alkyl group), a sulfobetaine group (—RR'N$^+$(CH$_2$)$_n$SO$_3^-$), a carboxyl betaine group (—RR'N$^+$(CH$_2$)$_n$COO$^-$), wherein R and R' are independently a C1 to C20 alkyl group), an azido group (—N$_3$), an amidino group (—C(=NH)NH$_2$), a hydrazino group (—NHNH$_2$), a hydrazono group (=N(NH$_2$)), an acyl group (—C(=O)R, wherein R is hydrogen or an alkyl group), a carbamoyl group (—C(O)NH$_2$), a thiol group (—SH), an ester group (—C(=O)OR, wherein R is hydrogen, a C1 to C6 alkyl group, or a C6 to C12 aryl group), a carboxyl group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), or a phosphoric acid group (—PO$_3$H$_2$) or a salt thereof (—PO$_3$MH or —PO$_3$M$_2$, wherein M is an organic or inorganic cation), instead of hydrogen, provided that the substituted atom's normal valence is not exceeded.

The prefix "hetero" refers to a compound or group includes at least heteroatom (e.g., 1 to 3 hetero atoms), wherein the heteroatom(s) is each independently N, O, S, Si, or P.

"Combination thereof" refers to a combination of at least two components, wherein the combination is in the form of a mixture, a laminate, a composite, a copolymer, an alloy, a blend, or a reaction product of components.

In a chemical formula the mark "*" refers to a point of attachment to an atom or a Chemical Formula that may be the same or different.

The term "(meth)acrylate" refers to methacrylate and acrylate, i.e., an ester of the formula H$_2$C=C(CH$_3$)—C (=O)OR or H$_2$C=CH—C(=O)OR wherein R is a carbon atom. The term "(meth)acryl" refers to a methacryl or acryl group of the same formulas wherein R is a carbon atom, a hydrogen atom, or a cation.

Research into a thin film hard coating which is capable of providing scratch resistance has been conducted, however, the hard coating may be easily scratched by a sharp edge such as a ball point pen, and the surface thereof may be cracked by repeatedly bending the same. It is also difficult to use a hard coating for a foldable device, or the like, due to a low flexibility of the hard coating.

A self-healing material has excellent flexibility, but has problems in that only minute scratches are healed while deep scratches are not healed. In addition, the self-healing requires a long period of time even if healed, which is lacking in practicality. Thus a material having excellent flexibility and which is capable of rapidly healing the deep scratches is needed to protect a flexible display.

In an embodiment, a method of accelerating self-healing includes contacting a plasticizing solvent with a scratched portion (e.g., a scratched site) of a self-healing urethane (meth)acrylate-derived (e.g., a urethane(meth)acrylate-based) material. The plasticizing solvent may include water, an alcohol, a ketone, or a combination thereof. That is, an embodiment provides a method in which a general consumer may easily and rapidly heal a scratch using a solvent which is easily available in a market and which is harmless to a human body. As used herein, the term "self-healing" refers to the ability of a material to heal (e.g., repair) relatively minor damage (e.g., scratches, nicks, cuts, and the like) present in the material. In an embodiment, the self-healing of the material may be accelerated by contact with a plasticizing solvent.

Without being bound by any particular theory, it is estimated that the healing time for a scratch, which is an amount of time for smoothing the surface, is shortened by softening or swelling of a polymer at the scratched site when contacted with the plasticizing solvent and increasing a mobility of the polymer chain.

Figure 2:
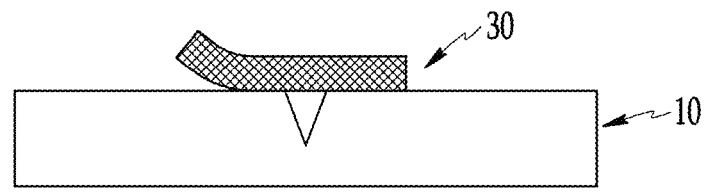
Figure 3:
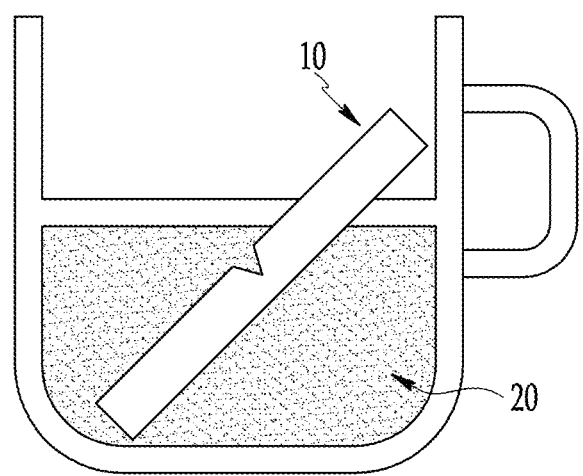

A variety of methods may be used to contact a plasticizing solvent with a scratched site. For example, as shown in FIG. 1, the plasticizing solvent may be dripped on a scratched site. Furthermore, as shown in FIG. 2, a material in which the plasticizing material is absorbed is attached to a scratched site. The material may include any material capable of absorbing and being wetted by the plasticizing material, for example, a cloth, a cotton, a non-woven fabric, a paper, a tissue, a band, and the like. For example, a cloth absorbed with a plasticizing solvent such as water may be contacted with a scratched site, so the self-healing may be accelerated. In addition, as shown in FIG. 3, a urethane (meth)acrylate-derived material or a scratched site of the urethane(meth)acrylate-derived material may be dipped in a plasticizing solvent.

The plasticizing solvent may include water, an alcohol, a ketone, or a combination thereof, is a commercially available material, and a type of volatile liquid. The plasticizing solvent may be for example, water, ethanol, methanol, propanol, isopropanol, butanol, isobutanol, hexanol, heptanol, octanol, decanol, ethylene glycol, diethylene glycol, triethylene glycol, ethylene glycol methyl ether, diethylene glycol methyl ether, triethylene glycol methyl ether, ethylene glycol ethyl ether, diethylene glycol ethyl ether, triethylene glycol ethyl ether, ethylene glycol monopropyl ether, diethylene glycol monopropyl ether, triethylene glycol monopropyl ether, ethylene glycol monobutyl ether, diethylene glycol monobutyl ether, triethylene glycol monobutyl ether, ethylene glycol dibutyl ether, diethylene glycol dibutyl ether, triethylene glycol dibutyl ether, ethylene glycol monohexyl ether, diethylene glycol monohexyl ether, triethylene glycol monohexyl ether, acetone, methyl ethyl ketone, diethyl ketone, methyl isopropyl ketone, diphenyl ketone, cyclohexanone, or 2-heptanone, or a mixture of two or more thereof may be used. When two or more solvents are mixed, the plasticizing solvent may be also referred to as a plasticizing solution.

For example, the plasticizing solvent may be water, methanol, ethanol, or acetone, or a combination thereof.

The scratches may be self-healed within several seconds up to several tens of hours according to the method, and it may be self-healed within several seconds or up to several tens of hours depending upon the type or a thickness of the urethane(meth)acrylate-derived material, the depth of the scratch, and the like. For example, a scratch in the urethane (meth)acrylate-derived material may be self-healed by the method within about 10 seconds to about 72 hours, for example, may be self-healed within about 1 minutes to about 48 hours, for example, may be self-healed within about 5 minutes to about 24 hours, or may be self-healed within about 10 minutes to about 12 hours, but is not limited thereto.

The method may include contacting the scratched site of the self-healing urethane(meth)acrylate-derived material with the plasticizing solvent for a predetermined amount of time. That is, the self-healing may be accelerated by contacting the scratched site with the plasticizing solvent for a predetermined time. For example, the contacting of the scratched site with the plasticizing solvent may be maintained for about 10 seconds to about 24 hours, for example, for about 10 seconds to about 12 hours, or for about 1 minute to about 1 hour. The time of contacting the scratch site with the plasticizing solvent may be appropriately adjusted depending upon a type or a thickness of the urethane(meth) acrylate-derived material and a depth of the scratch.

The self-healing accelerating method may include contacting a scratched site of the self-healing urethane(meth) acrylate-derived material with a plasticizing solvent and then removing the plasticizing solvent from the scratched site.

For example, the self-healing accelerating method may include: (a) contacting a scratched site of the self-healing urethane(meth)acrylate-derived material with a plasticizing solvent, (b) allowing the self-healing urethane(meth)acrylate-derived material contacted with a plasticizing solvent to stand for a predetermined amount of time, (c) removing the plasticizing solvent from the scratched site, and (d) allowing the self-healing urethane(meth)acrylate-derived material from which the plasticizing solvent has been removed to stand for a predetermined time. The plasticizing solvent may be partially absorbed on the scratched site. In this case, if the remaining plasticizing solvent which is not absorbed is removed, for example, by wiping the same, the self-healing time may be further shortened.

In the accelerating method, the step (b) of allowing the self-healing urethane(meth)acrylate-derived material-derived contacted with a plasticizing solvent to stand for a predetermined amount of, time may be a step for absorbing the plasticizing solvent onto the scratched site, and may also be a step of softening a polymer at the scratched site by the plasticizing solvent. In addition, the step (d) allowing the self-healing urethane(meth)acrylate-derived material from which the plasticizing solvent has been removed to stand again for a predetermined time, may be a step for waiting for the healing of the scratch(es), and also a step for increasing the mobility of a polymer chain at the scratched site and for smoothing the surface.

The strength of the self-healed scratch may vary depending upon a type and a thickness of the self-healing urethane (meth)acrylate-derived material, and the like. According to the self-healing accelerating method of an embodiment, even a scratch formed by a material (e.g., a pencil) having a very strong strength may be self-healed. For example, the self-healable scratch may be formed by a pencil having a hardness of 4B to 9H at a load of 1 kilogram-force (kgf). In other words, according to the method, the scratch formed by a pencil having a strength of, for example, greater than or equal to 2B, greater than or equal to B, greater than or equal to 1H, or greater than or equal to 3H, at a load of 1 kgf, may be also self-healed at a very high speed, that is, within a short period of time).

The self-healing urethane(meth)acrylate-derived material may include a urethane(meth)acrylate compound having self-healing characteristics or may be a derivative thereof.

For example, the self-healing urethane(meth)acrylate-derived material may be an interior or exterior component of an electronic device such as a smart phone, a tablet PC, a camera, or a touch screen panel, an interior or exterior component for a home appliance, an automobile, or an electronic part, a plastic molded article, or a film for protecting the surface of any of the foregoing various products. For example, the material may be a protective film or a coating layer on an electronic device, for example, a film for protecting the surface of a flexible display device and which has foldable, bendable, or rollable characteristics. The film may be a single layer or a laminated structure in which a plurality of layers is stacked.

Figure 4:
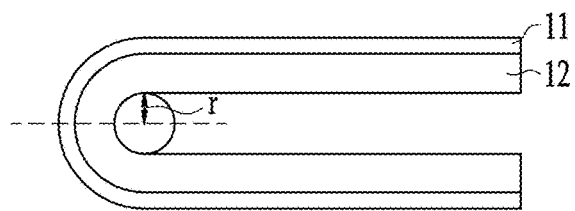
FIG. 4 is a schematic view showing a cross-sectional surface of a foldable film or a foldable device, which is one embodiment of the self-healing urethane(meth)acrylate-derived material.

FIG. 4 is a schematic view showing a cross-sectional surface of a folded part of a foldable film or a foldable device. The reference number 11 refers to a self-healing urethane(meth)acrylate-derived material according to an embodiment; and the reference numeral 12 refers to a substrate or a device.

Figure 5:
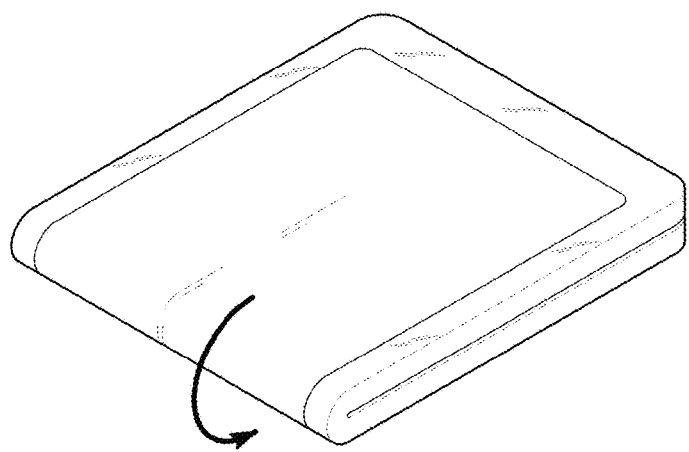
FIG. 5 is a schematic view showing a folded shape of a foldable display, which is one embodiment of the self-healing urethane(meth)acrylate-derived material.

FIG. 5 is a schematic view showing a folded shape of a foldable display. The self-healing urethane(meth)acrylate-derived material according to an embodiment may be an exterior material of the foldable display or a protective film positioned on the surface of the foldable display.

The self-healing urethane(meth)acrylate-derived material may be, for example, a material prepared by curing a self-healing composition including a urethane(meth)acrylate compound. For example, the material may be a film or a coating film including a cured product of a self-healing composition including urethane(meth)acrylate compound. For example, the material may be a film prepared by coating the self-healing composition on a surface of a substrate or a device and curing the same. In an embodiment, the curing is a photo-curing.

Hereinafter, the self-healing composition according to an example embodiment is described. The self-healing composition may be an ultraviolet (UV) light-curable composition that is cured by exposure to ultraviolet (UV) light. In this case, the self-healing composition is coated on the surface of a device and cured by ultraviolet (UV) light to provide a film, and the obtained film may be a protective film which is transparent and flexible and has self-healing characteristics. The ultraviolet (UV) light-curable self-healing composition according to an embodiment has superior self-healing characteristics as compared to a thermal curable composition, and demonstrates enhanced process speed and suppressed yellowing of the cured product.

In the self-healing composition, the urethane(meth)acrylate compound may be a compound having a urethane group and a (meth)acrylate group, and the compound may be a monomer, an oligomer, or a polymer. For example, the urethane(meth)acrylate compound may be a compound having two (meth)acrylate groups and six or more urethane groups, and a composition including the urethane(meth)acrylate compound and a cured product thereof may have improved self-healing characteristics and improved flexible and optical properties.

The urethane(meth)acrylate compound has a structure having two (meth)acrylate groups ($CH_2$=$CHC$(=$O$)$O$— or $CH_2$=$C$ $CH_3C$(=$O$)$O$—) at both of the terminal ends. The (meth)acrylate group at the terminal ends is a cross-linkable functional group, and may be a kind of a chemical cross-linking site. As the urethane(meth)acrylate compound has two (meth)acrylate groups, it may have an appropriate cross-linking degree, and a composition and a cured product including the urethane(meth)acrylate compound may have appropriate flexibility, elasticity, and hardness, and may show improved flexibility. For example, a compound including more than two cross-linkable functional groups such as (meth)acrylate groups, for example, greater than or equal to about three or greater than or equal to about four, has a high cross-linking degree and a relatively low flexibility, so has a limit in being applied to a foldable device or the like.

Furthermore, the urethane(meth)acrylate compound has 3 or more diisocyanate-derived units and 2 or more diol-derived units, so as to finally provide a structure having 6 or more urethane groups (—$NHC$(=$O$)$O$—) between the chemical crosslinking sites. The urethane(meth)acrylate compound may have at least one physical crosslinking site or 6 or more physical crosslinking sites between chemical crosslinking sites, i.e., between the (meth)acrylate groups. A physical crosslinking site refers to a moiety capable of providing a hydrogen bond and is broken prior to the chemical crosslinking site when the material is stressed and then recovers by itself, and may also refer to a moiety capable of being self-healed when scratched. According to an embodiment, urethane(meth)acrylate compound having six urethane groups shows self-healing characteristics within a short time period at a room temperature upon being scratched, and may be self-healed even when the urethane (meth)acrylate compound is scratched with a high pencil having a hardness of greater than or equal to 2H.

On the other hand, a urethane(meth)acrylate compound having less than 6 urethane groups between chemical cross-linking sites, for example, a general urethane(meth)acrylate having four urethane groups which have a structure derived from two diisocyanate-derived units and one diol-derived unit, rarely demonstrates self-healing characteristics when scratched, or only shows low recovered scratch strength. The urethane(meth)acrylate compound according to an embodiment may have a structure including at least one diisocyanate-derived unit between two diisocyanate-derived units.

The urethane(meth)acrylate compound may include for example greater than or equal to about 6 urethane groups, or greater than or equal to about 8, or greater than or equal to about 10, and less than or equal to about 100, or less than or equal to about 60, or less than or equal to about 40, or less than or equal to about 20, or less than or equal to about 14, urethane groups.

Generally, the urethane(meth)acrylate compound may be obtained by reacting diisocyanate, which is a compound having two isocyanate groups, with a diol, which is a compound having two hydroxy groups, to synthesize a urethane compound, and reacting the urethane compound with (meth)acrylate having a hydroxy group. According to an embodiment, a urethane compound is synthesized from at least 3 diisocyanate and at least 2 diols to provide at least 4 urethane groups. The urethane compound is then reacted with 2 equivalents of a (meth)acrylate compound having a hydroxy group to obtain the urethane(meth)acrylate compound having at least 6 urethane groups and two (meth)acrylate groups.

The urethane(meth)acrylate compound may be for example an aliphatic urethane(meth)acrylate. That is, the urethane(meth)acrylate compound may be derived from an aliphatic diisocyanate, an aliphatic diol, and an aliphatic hydroxy(meth)acrylate. For example, the urethane(meth)acrylate compound may be a reaction product of (e.g., derived from) (a) a C1 to C20 aliphatic diisocyanate, (b) a C1 to C100 aliphatic diol, and (c) a C1 to C20 hydroxyalkyl (meth)acrylate. When an aliphatic urethane(meth)acrylate is used, the composition including the same and the film prepared therefrom have excellent stability to ultraviolet (UV) light and demonstrate excellent transparency and flexibility, and thus it is suitable for a coating film of a foldable device.

Specific examples of the aliphatic diisocyanate are not particularly limited, and may include, for example, isophorone diisocyanate, hexamethylene diisocyanate, 4,4-dicyclohexylmethane diisocyanate, hydrogenated xylene diisocyanate, norbornene diisocyanate, lysine diisocyanate, or the like. A combination comprising at least one of the foregoing may also be used.

The hydroxy(meth)acrylate is not particularly limited, and may be for example, a C1 to C20 hydroxyalkyl(meth)acrylate, or a C1 to C15 hydroxyalkyl(meth)acrylate, or a C2 to C10 hydroxyalkyl(meth)acrylate, and the like, specifically, hydroxyethyl(meth)acrylate, hydroxypropyl(meth)acrylate, or hydroxybutyl(meth)acrylate. A combination comprising at least one of the foregoing may also be used. When using hydroxyalkyl(meth)acrylate having a relatively low carbon number, the urethane(meth)acrylate synthesized therefrom may have excellent transparency and flexibility and show a stability to ultraviolet (UV) light.

In the synthesis of the urethane(meth)acrylate compound, the diol compound may include a long chain diol, a short chain diol, or both a long chain and a short chain diols. For example, the urethane(meth)acrylate compound may be a reaction product of (a) a diisocyanate, (b1) a long chain diol, (b2) a short chain diol, and (c) a hydroxy(meth)acrylate.

The long chain diol may be a C10 to C100 diol, for example a C10 to C100 polyalkylene glycol, a C10 to C100 polylactoneglycol, or a combination thereof. More specifically, the long chain diol may be polyethylene glycol, polypropylene glycol, polytetramethylene glycol, polycaprolactone glycol, and the like.

The short chain diol may be a C1 to C9 diol, for example a C1 to C9 alkylene glycol, and specifically, ethylene glycol, propylene glycol, butylene glycol, and the like.

When the diol compound includes the long chain diol and the short chain diol, the urethane(meth)acrylate compound synthesized therefrom may show excellent flexibility, hardness, and transparency.

Based on a total weight of the diol compound, the long chain diol, for example, a C10 to C100 polyalkylene glycol and/or a C10 to C100 polylactone glycol, may be included in an amount of about 50% to about 99%, for example, about 55% to about 90%, or about 60% to about 80% by weight. In addition, based on the total weight of the diol compound, the short chain diol, for example, a C1 to C9 alkylene glycol, may be included in about 1% to about 50%, for example, about 10% to about 45% or about 20% to about 40% by weight. When the amounts of the long chain diol and the short chain diol fall within these ranges, the synthesized urethane(meth)acrylate compound may show excellent flexibility, hardness, and transparency.

For example, the urethane(meth)acrylate compound may be derived from (a) a C1 to C20 aliphatic diisocyanate, (b1) a C10 to C100 polyalkylene glycol or polylactoneglycol, (b2) a C1 to C9 alkylene glycol, and (c) a C2 to C10 hydroxyalkyl(meth)acrylate.

The urethane(meth)acrylate compound may be for example represented by Chemical Formula 1.

Chemical Formula 1

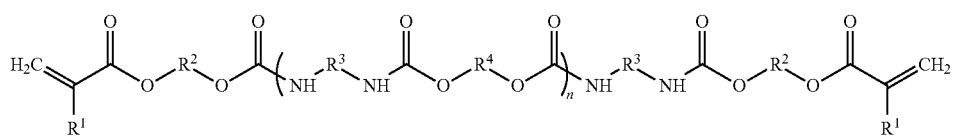

In Chemical Formula 1, n is a numeral of 2 to 30, $R^1$ is hydrogen or a methyl group, $R^2$ and $R^3$ are each independently a substituted or an unsubstituted C1 to C20 alkylene group, or a substituted or an unsubstituted C3 to C20 cycloalkylene group, $R^4$ is a substituted or an unsubstituted C1 to O10 alkylene or a C2 to C100 divalent functional group including —R—O—R'—, —R—C(=O)O—R'—

(wherein, R and R' are independently a C1 to 010 alkylene group), or a combination thereof.

In Chemical Formula 1, n may be for example a numeral of 2 to 20, or 2 to 10, or 2 to 5, or 3 to 10, or 4 to 10. A urethane(meth)acrylate compound represented by Chemical Formula 1 having n of greater than or equal to about 2 may show excellent self-healing characteristics. On the other hand, a urethane(meth)acrylate having n of 1 rarely shows self-healing characteristics or is only capable of healing a low scratch strength (e.g., a scratch formed by a pencil having a low hardness).

Chemical Formula 1 has a structure including a total of 2 (meth)acrylate groups, which are functional groups capable of cross-linking, at both terminal ends. In Chemical Formula 1, $R^2$ is a moiety derived from hydroxy(meth)acrylate, and may be an aliphatic group such as alkylene or cycloalkylene, and the like. The $R^2$ may be, for example a substituted or unsubstituted C2 to C10 alkylene group, or a substituted or unsubstituted C2 to C6 alkylene group, and in this case, the urethane(meth)acrylate compound represented by Chemical Formula 1 may exhibit improved transparency and flexibility.

In Chemical Formula 1, $R^3$ is a moiety derived from diisocyanate, and may be an aliphatic group such as alkylene or cycloalkylene. The $R^3$ may be represented by, for example, Chemical Formula 3-1 to Chemical Formula 3-6, or a combination thereof, but is not limited thereto. A urethane(meth)acrylate compound including the following $R^3$ moiety may exhibit excellent transparency and flexibility.

In Chemical Formula 1, $R^4$ is a moiety from a diol and may be a C1 to C10 alkylene or a C1 to C100 aliphatic group. In Chemical Formula 1, when $R^4$ is a substituted or unsubstituted C1 to C10 alkylene, the $R^4$ moiety may be derived from a short chain diol or a C1 to C10 alkylene glycol, and $R^4$ may be for example a C1 to C9 alkylene, for example, ethylene, propylene, butylene, isobutylene, and the like. In Chemical Formula 1, when $R^4$ is a C2 to C100 divalent aliphatic organic group including —R—O—R'—, —R—C(=O)O—R'— (wherein, R and R' are independently a C1 to C10 alkylene group), the $R^4$ moiety may be derived from a long chain diol, polyalkylene glycol, polylactoneglycol, or a combination thereof.

In the definition of $R^4$ of Chemical Formula 1, the C2 to C100 divalent aliphatic organic group including —R—O—R'— may refer to a divalent aliphatic organic group including one or more —R—O—R'— group and the C2 to C100 divalent aliphatic organic group including the —R—C(=O)O—R'— may refer to a divalent aliphatic organic group including one or more —R—C(=O)O—R'— group. In Chemical Formula 1, $R^4$ may be for example a C2 to C100 aliphatic group including the —R—O—R'— and/or the —R—C(=O)O—R'—, for example a C2 to C100 alkylene or cycloalkylene including the —R—O—R'— and/or the —R—C(=O)O—R'—.

For example, in Chemical Formula 1, a —O—$R^4$—O— moiety may be represented by Chemical Formula 4-1 to Chemical Formula 4-4, or a combination thereof.

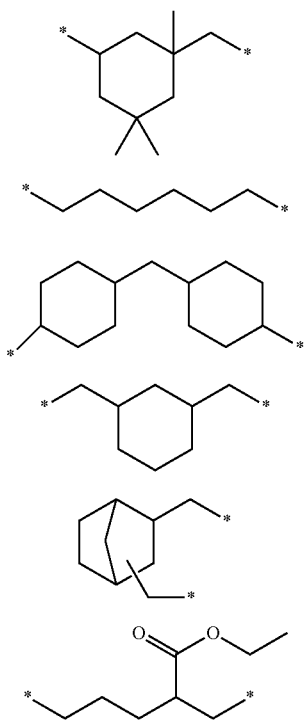

Chemical Formula 3-1

Chemical Formula 3-2

Chemical Formula 3-3

Chemical Formula 3-4

Chemical Formula 3-5

Chemical Formula 3-6

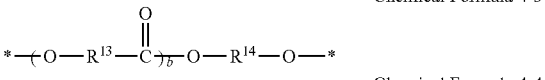

Chemical Formula 4-1

Chemical Formula 4-2

Chemical Formula 4-3

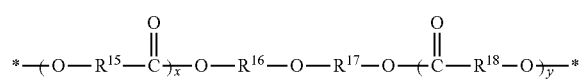

Chemical Formula 4-4

In Chemical Formula 4-1 to Chemical Formula 4-4, $R^{11}$ to $R^{18}$ are each independently a substituted or unsubstituted C1 to C10 alkylene group. In Chemical Formula 4-2 to Chemical Formula 4-4, a, b, x, and y are each independently a numeral of 2 to 100, for example a numeral of 2 to 50, a numeral of 2 to 40, a numeral of 2 to 30, or a numeral of 2 to 20.

The moiety represented by Chemical Formula 4-1 may be a moiety derived from a short chain diol, for example alkylene glycol, and the moieties represented by Chemical Formula 4-2 to Chemical Formula 4-4 may be moieties derived from a long chain diol, for example polyalkylene glycol or polylactone glycol.

The —O—$R^4$—O— moiety of Chemical Formula 1 may be for example represented by Chemical Formula 4-11 to Chemical Formula 4-17, or a combination thereof.

Chemical Formula 4-11

Chemical Formula 4-12

Chemical Formula 4-13

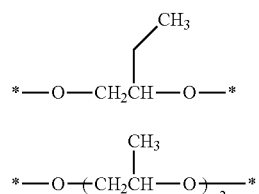

Chemical Formula 4-15

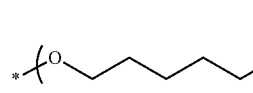

Chemical Formula 4-14

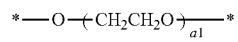

Chemical Formula 4-16

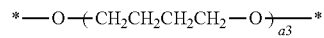

Chemical Formula 4-17

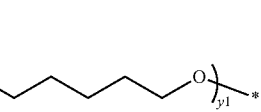

In Chemical Formula 4-14 to Chemical Formula 4-17, a1, a2, a3, x1, and y1 are independently a numeral of 2 to 100, for example a numeral of 2 to 50, a numeral of 2 to 40, a numeral of 2 to 30, or a numeral of 2 to 20.

In Chemical Formula 1, $R^4$ moiety is repeated for greater than or equal to 2 times by repeating the unit represented by n. In other words, 2 or more of $R^4$ exist between the terminal ends the (meth)acrylate groups, wherein each $R^4$ group may be same or different from each other. A diol compound used for synthesizing the urethane(meth)acrylate compound may include a long chain diol or a short chain diol, alone or as a mixture thereof, so a $R^4$ moiety in Chemical Formula 1 may include a repeat of only the group derived from the long chain diol or a repeat of only the group derived from the short chain diol, both the group derived from the long chain diol and the group derived from the short chain diol may be present. For example, at least one of $R^4$ repeated between the (meth)acrylate groups at the terminal ends in Chemical Formula 1 may be a substituted or unsubstituted C1 to C10 alkylene, and at least one of the $R^4$ group(s) may be a C2 to C100 divalent functional group containing —R—O—R'— and/or —R—C(=O)O—R'— (wherein, R and R' are independently a C1 to C10 alkylene group).

The urethane(meth)acrylate compound may have a weight average molecular weight (Mw) of about 3,000 grams per mole (g/mol) to about 100,000 g/mol, for example, about 3,000 g/mol to about 50,000 g/mol, or about 5,000 g/mol to about 10,000 g/mol. If satisfying the above ranges of weight average molecular weight, the urethane (meth)acrylate compound may have excellent transparency and flexibility and self-healing characteristics and may also show a stability to ultraviolet (UV) light. The weight average molecular weight may be based upon a polystyrene-converted average molecular weight as measured using gel permeation chromatography.

The urethane(meth)acrylate compound may have a glass transition (Tg) temperature of about −40° C. to about 40° C., for example, about −30° C. to about 30° C., or about −20° C. to about 20° C. When the glass transition temperature falls within these ranges, the urethane(meth)acrylate may show excellent transparency and flexibility and may have self-healing characteristics.

The self-healing composition may further include a polyhedral oligomeric silsesquioxane (POSS) in addition to the urethane(meth)acrylate compound. In this case, the material including the self-healing composition and a cured product thereof may show excellent hardness and self-healing characteristics and also maintain excellent optical properties and flexibility or the like.

The type of polyhedron oligomeric silsesquioxane (POSS) is not particularly limited, but may include, for example, POSS substituted with an alkyl group, an aryl group, a (meth)acryl group, a vinyl group, an amino group, an alcoholic group, a carboxyl group, a halogen group, or a combination thereof.

Alkyl POSS substituted with the alkyl group may be for example, octamethyl POSS, octaethyl POSS, octaisobutyl POSS, octaisooctyl POSS, trifluoropropyl POSS, and the like. Aryl POSS substituted with the aryl group may be for example, octaphenyl POSS, dodecaphenyl POSS, trisilanolphenyl POSS, tetrasilanolphenyl POSS, aminopropylphenyl POSS, phenylisobutyl POSS, and the like. (Meth)acryloyl POSS substituted with the (meth)acryl group may be for example, (meth)acryloyl POSS, (meth)acrylpropyl POSS, (meth)acrylisobutyl POSS, (meth)acrylisooctyl POSS, and the like. For example, POSS substituted with a phenyl group shows excellent compatibility with the urethane(meth)acrylate compound and improves the hardness, self-healing characteristics, and optical properties of the composition including the same.

The self-healing composition may include a silica particle instead of, or in addition to, the POSS.

The self-healing composition may further include a hardener and a solvent in addition to the urethane(meth)acrylate and the POSS.

In the self-healing composition including the urethane (meth)acrylate compound, the POSS, the hardener, and the solvent, the POSS may be included in an amount of about 0.1 wt % to about 20 wt %, for example, about 0.1 wt % to about 15 wt %, or about 0.1 wt % to about 10 wt %, or about 0.1 wt % to about 8 wt %, or about 0.5 wt % to about 5 wt %, based on the total solid content of the self-healing composition. When the POSS is included within the above solid content range, the composition including the same may show excellent self-healing characteristics and transparency.

The hardener may be for example, a photoinitiator, a free radical photoinitiator, an ionic photoinitiator, or a combination thereof. For example, the hardener may include benzophenone, another ketone initiator, benzoic acid, anthraquinone, acyl phosphine, or the like, or a combination thereof, but is not limited thereto. Specific examples of the hardener may include acetophenones such as diethoxyacetophenone, 2-hydroxy-2-methyl-1-phenylpropan-1-one, benzyl dimethyl ketal, 1-hydroxycyclohexyl phenyl ketone, 2-methyl-2-morphine(4-thiomethylphenyl)propan-1-one, and the like; benzoin ethers such as benzoin methyl ether, benzoin ethyl ether, benzoin isopropyl ether, benzoin isobutyl ether, and the like; benzophenones such as benzophenone, methyl o-benzoyl benzoate, 4-phenylbenzophenone, 4-benzoyl-4'-methyldiphenylsulfurous acid, 4-benzoyl-N,N-dimethyl-N-[2-(1-oxo-2-propenyloxy)ethyl] benzene methanamium bromide, (4-benzoylbenzyl)trimethylammonium chloride, and the like; thioxanthones such as 2,4-diethylthioxanthone, 1-chloro-4-dichlorothioxanthone, and the like; 2,4,6-trimethylbenzoyldiphenylbenzoyloxide, and the like, which may be used singularly or as a mixture of two or more.

The hardener may be included in an amount of about 0.01 wt % to about 5 wt %, for example about 0.1 wt % to about 3 wt %, based on a total solid content of the self-healing composition. When the hardener is included within these ranges, a cured product having good properties may be obtained.

The type of solvent may have no particular limit as long as it may dissolve or disperse the aforementioned components, but may include for example, an aliphatic hydrocarbon solvent such as hexane, heptane, methylene chloride, and the like; an aromatic hydrocarbon solvent such as benzene, toluene, pyridine, quinoline, anisole, mesitylene, xylene, and the like; a ketone-containing solvent such as methyl isobutyl ketone, 1-methyl-2-pyrrolidinone (NMP), cyclohexanone, acetone, and the like; an ether-containing solvent such as tetrahydrofuran (THF), isopropyl ether, and the like; an acetate-containing solvent such as ethyl acetate, butyl acetate, propylene glycol methyl ether acetate, and the like; an alcohol-containing solvent such as isopropyl alcohol, butanol, and the like; an amide-containing solvent such as dimethyl acetamide, dimethylformamide (DMF), and the like; a nitrile-containing solvent such as acetonitrile, benzonitrile, and the like; and mixtures of the solvents, but is not limited thereto.

The self-healing urethane(meth)acrylate material according to an embodiment may be a film including a cured product of the self-healing composition, and the film may show excellent optical properties. For example, the film may have a light transmittance of greater than or equal to about 80%, or greater than or equal to about 90%. In addition, the film may have a yellowness index of less than or equal to about 3, for example, less than or equal to 1, or less than or equal to about 0.2. In addition, the film may have a haze of less than about 5%, for example, less than about 3%, or less than about 1%.

In addition, the thickness of the film may be adjusted according to the usage, and may be controlled within the range providing the self-healing property. For example the film may have a thickness of about 10 μm to about 500 μm, for example, about 20 μm to about 200 μm, or about 30 μm to about 100 μm.

Meanwhile, the film may further include a functional layer on one surface or on both surfaces thereof. In other words, the self-healing urethane(meth)acrylate-derived material may include a film including a cured product of the self-healing composition and a functional layer positioned on at least one surface of the film. The functional layer may include, for example, an anti-fingerprinting coating layer The anti-fingerprinting coating layer may be a self-healing coating layer having a friction coefficient which is low enough to provide good slip properties, prevent contamination such as a fingerprint, and also having a high water repellency and a high flexibility. In this case, even if the film formed of the self-healing urethane(meth)acrylate-derived material is scratched on the surface including the anti-fingerprinting coating layer, it is easily and rapidly self-healed according to the self-healing accelerating method.

The anti-fingerprinting coating layer may be, for example, a coating layer including polyrotaxane, for example, a coating including polyrotaxane, POSS, and a fluorine-containing acryl compound. For example, the anti-fingerprinting coating layer may be a coating layer obtained by curing a composition including polyrotaxane.

Hereinafter, the embodiments are illustrated in more detail with reference to examples. However, these examples are exemplary, and the present disclosure is not limited thereto.

EXAMPLES

Preparation Example 1: Preparation of Self-healing Materials

Figure 6:
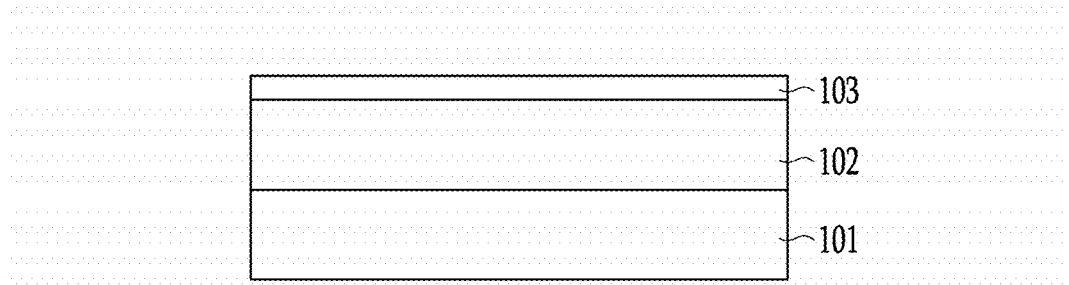
FIG. 6 is a schematic view showing a cross-section of a film of a self-healing urethane(meth)acrylate-derived material obtained in accordance with Preparation Example 1.

FIG. 6 is a schematic view showing a folded cross-sectional surface of a self-healing material film obtained according to Preparation Example 1.

The self-healing material has a laminated structure including a lower layer 101 consisting of a urethane(meth)acrylate-derived film, a upper layer 102 laminated on the lower layer 101 and consisting of a urethane(meth)acrylate-derived film, and an anti-fingerprinting coating layer 103 laminated on the upper layer 102, wherein the lower layer 101, the upper layer 102, and the anti-fingerprinting coating layer 103 may be each prepared as follows:

(1) Preparation of Urethane(Meth)Acrylate-Derived Lower Layer 101

73.6 g (0.14 mol) of polycaprolactone diol (PCL 205U, Deicel), 5.407 g (0.06 mol) of butane diol, 66.9 g (0.301 mol) of isophorone diisocyanate, and 73.5 g of ethyl acetate are introduced into a three-necked flask and mixed under a nitrogen atmosphere and heated until 70° C. They are reacted for 3 hours with continuous agitation and while maintaining a constant temperature. Then, after lowering the temperature to 60° C. and adding 26.158 g (0.201 mol) of hydroxypropylacrylate, the materials are additionally reacted for 2 hours with agitation, and then the solution is cooled to provide an urethane acrylate oligomer. The obtained urethane acrylate shows a peak at 2270 cm$^{-1}$ in an infrared ray spectrophotometer, which corresponds to an isocyanate group, and the weight average molecular weight is about 4,000 g/mol. The obtained urethane acrylate has a structure including six urethane groups between the terminal acrylate groups, wherein the diisocyanate/diol/acrylate in the structure has a mole ratio of 3:2:2.

Based on the total solid weight, 1 wt % of trisilanolphenyl POSS (Hybrid Plastic) and 0.5 wt % of photoinitiator (Irgacure 184) are added into the obtained urethane(meth)acrylate to provide a self-healing composition. The prepared self-healing composition is coated on a substrate and dried at 80° C. for about 10 minutes and then cured by irradiating ultraviolet (UV) light for 3 seconds to provide a film having a thickness of about 60 μm and a glass transition temperature of about 17° C., and has an elastic coefficient of 7.5 MPa at 25° C., then is used as a lower layer 101.

(2) Preparation of Urethane(Meth)Acrylate-Derived Upper Layer 102

A self-healing composition is prepared in accordance with the same procedure as in the process of preparing the lower layer, except that the mole ratio of the diisocyanate/diol/acryl is adjusted to 4:3:2 to synthesize urethane(meth)acrylate having eight urethane groups between the terminal acrylate groups. The self-healing composition is coated on the obtained lower layer 101 and dried at 80° C. for about 10 minutes and cured by ultraviolet (UV) light for 3 seconds to provide a film which is used as an upper layer 102. The obtained film has a thickness of about 60 μm and a glass transition temperature of about 10° C., and has an elastic coefficient of about 2.8 MPA at 25° C.

(3) Preparation of Anti-Fingerprinting Coating Layer 103

The anti-fingerprinting coating layer 103 having a thickness of less than or equal to about 1 μm is formed on the surface of the upper layer 102 to provide a self-healing urethane(meth)acrylate-derived material in a form of a three-layered laminate film. 59 wt % of polyrotaxane (SM3403P, Advanced Softmaterials) including a cyclodextrin cyclic molecule in which a polycaprolactone functional group having a terminal end of methacrylate group is substituted, a polyethylene glycol- or polyethylene glycol-containing linear molecule penetrating a ring of the cyclic molecule, and adamantane capping groups at both terminal ends of the linear molecule and having a molecular weight of about 1,000,000 g/mol, 39 wt % of acryl POSS (Hybrid Plastic), 1 wt % of fluorinated propyl POSS (Hybrid Plastic), and 1 wt % of a fluorinated acryl compound (KY-1203, ShinEtsu) are mixed to provide a self-healing anti-fingerprinting composition. The anti-fingerprinting composition is coated on a surface of the upper layer 102 and dried and then cured by ultraviolet (UV) for 2 minutes to provide the anti-fingerprinting coating layer 103.

EXAMPLES AND COMPARATIVE EXAMPLES

Example 1

A surface of the self-healing urethane(meth)acrylate-derived material obtained from Preparation Example 1, which is the surface formed with the anti-fingerprinting coating layer 103, is scratched with a 3H pencil under a load of 1 kgf and then water as a plasticizing solvent is dripped on the scratched site. After 10 minutes, the unabsorbed and remaining water is removed. The time for self-healing the scratch after being scratched is measured, and the results are shown in the following Table 1. Whether the scratch is self-healed or not is evaluated by the naked eye.

Example 2

The self-healing time of the scratch is measured in accordance with the same procedure as in Example 1, except that ethanol is used instead of water as a plasticizing solvent, and the results are shown in the following Table 1.

Example 3

The self-healing time of the scratch is measured in accordance with the same procedure as in Example 1, except that propanol is used instead of water as a plasticizing solvent, and the results are shown in the following Table 1.

Example 4

The self-healing time of the scratch is measured in accordance with the same procedure as in Example 1, except that methyl ethyl ketone is used instead of water as a plasticizing solvent, and the results are shown in the following Table 1.

Example 5

The self-healing time of the scratch is measured in accordance with the same procedure as in Example 1, except that a solution that water and ethanol are mixed at a weight ratio of 1:1 is used instead of water as a plasticizing solvent, and the results are shown in the following Table 1.

Example 6

The self-healing time of the scratch is measured in accordance with the same procedure as in Example 1, except that a solution of water and ethanol at a weight ratio of 1:2 is used instead of water as a plasticizing solvent, and the results are shown in the following Table 1.

Figure 7:
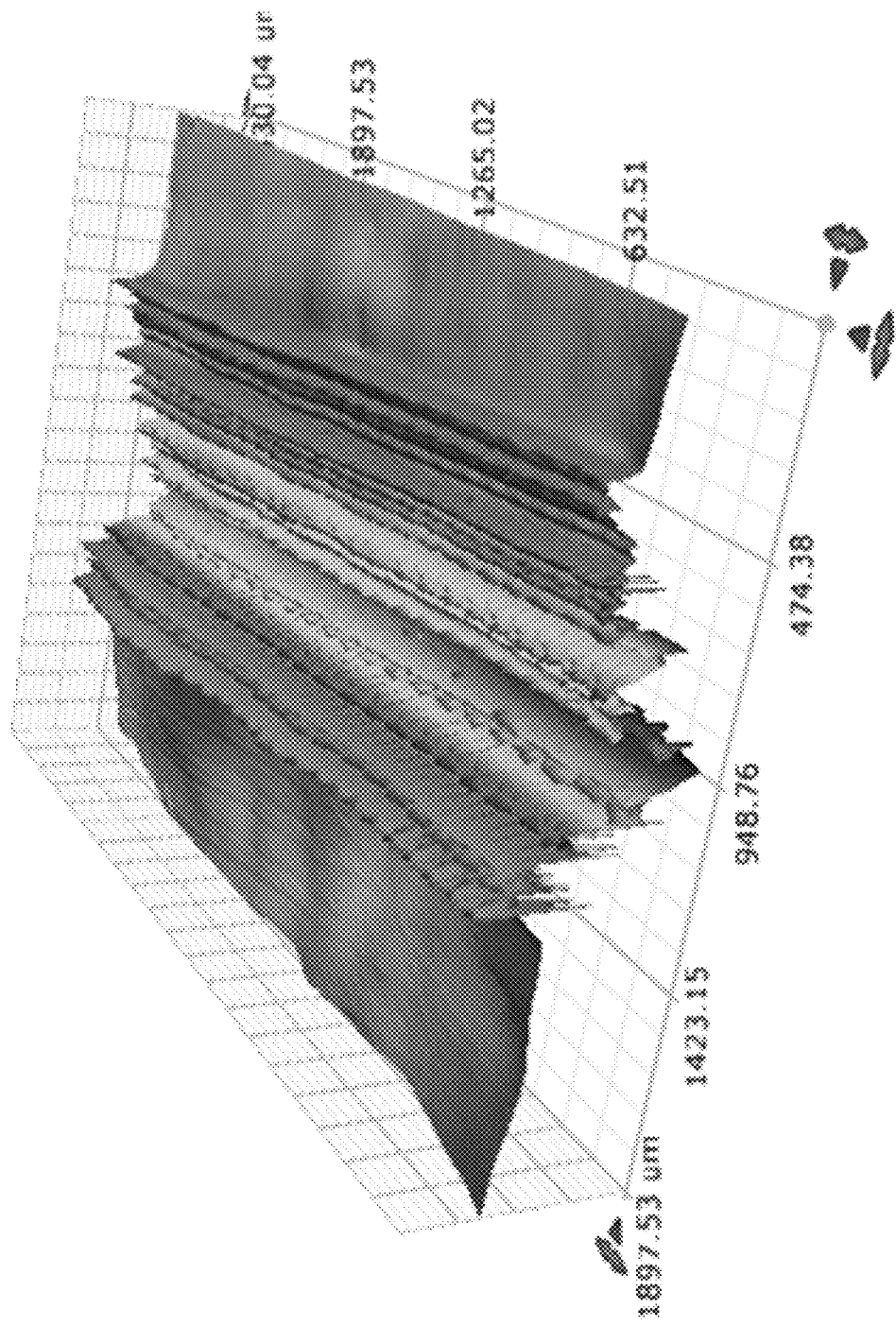
FIG. 7 is a 3D optical microscopic image showing a scratched site of the film of FIG. 6 directly after being scratched.
Figure 8:
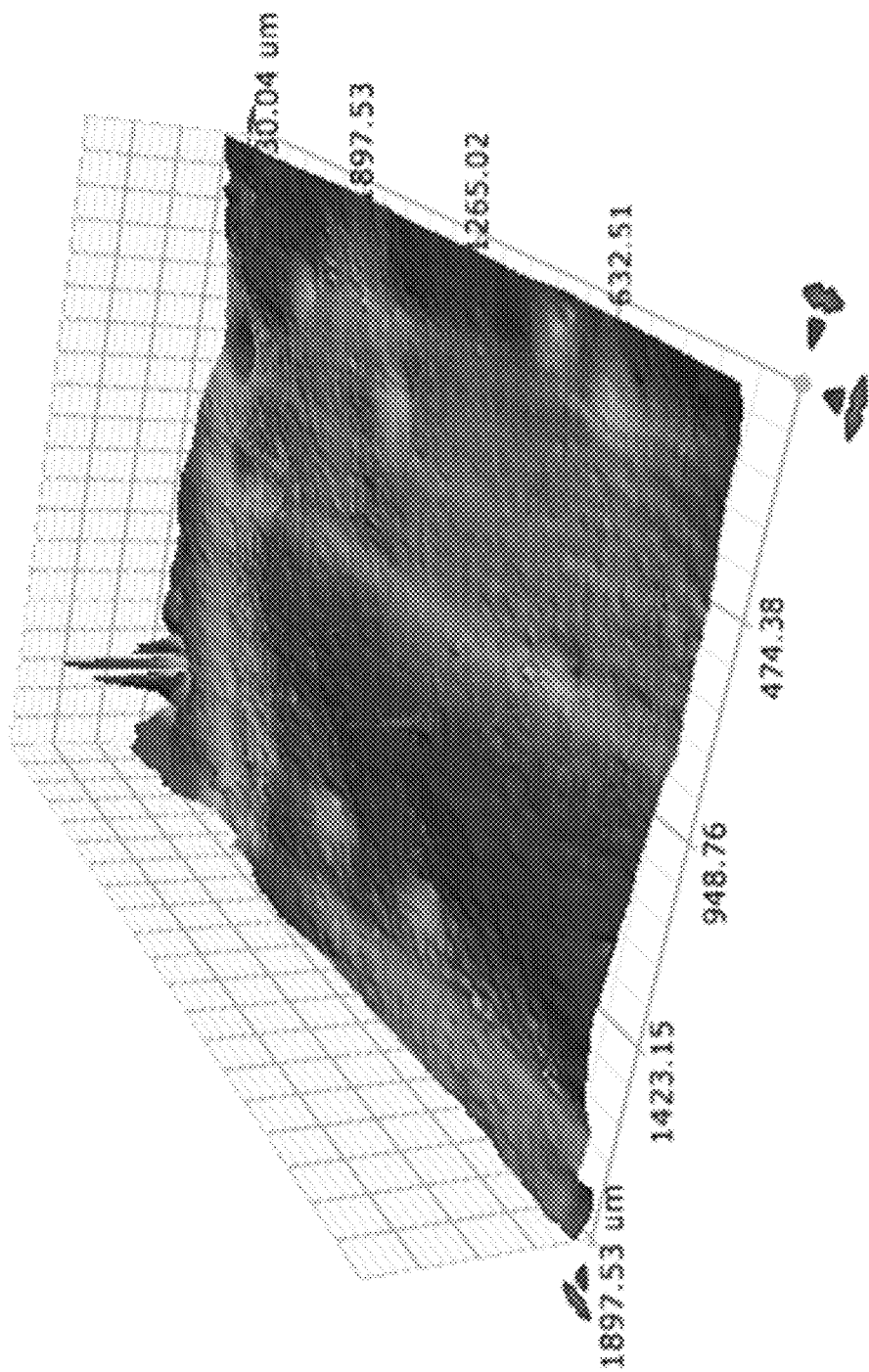
FIG. 8 is a 3D optical microscopic image showing the scratched site of in the film of FIG. 7 after the scratch is self-healed according to Example 6.

FIG. 7 is an image of a 3D Optical Microscope (Model name: Contour Elite X, Bruker) showing a scratch site directly after the material is scratched; and FIG. 8 is an image showing the scratch site 20 minutes after being scratched according to a method of Example 6. Referring to FIGS. 7 and 8, it is confirmed that the scratched site is completely healed after 20 minutes.

Comparative Example 1

A surface of the self-healing urethane(meth)acrylate-derived material obtained from Preparation Example 1, which is a surface formed with the anti-fingerprinting coating layer 103, is scratched with a 3H pencil under a load of 1 kgf, and then the self-healing time is measured. The results are shown in the following Table 1. In Comparative Example 1, the scratched site is not contacted with the plasticizing solvent.

TABLE 1

|  | Plasticizing solvent | Self-healing time (minute) |
| --- | --- | --- |
| Comparative Example 1 | None | 60 |
| Example 1 | Water | 30 |
| Example 2 | Ethanol | 20 |
| Example 3 | Propanol | 30 |
| Example 4 | Methyl ethyl ketone | 20 |
| Example 5 | water/ethanol = 1/1 (weight ratio) | 30 |
| Example 6 | water/ethanol = 1/2 (weight ratio) | 20 |

Referring to Table 1, in the case of Comparative Example 1 which is not contacted with the plasticizing solvent, the self-healing time of the scratched site is a total of 60 minutes, but in the cases of Examples 1 to 6, which are contacted with the plasticizing solvent of water, an alcohol, a ketone, or a combination thereof, the self-healing times are shortened to about 20 minutes to 30 minutes.

Example 7 to Example 10

The healing time of the scratched site is measured in accordance with the same procedure as in Example 6, but the contact time with the plasticizing solvent is changed as set forth in the following Table 2. In other words, the surface of self-healing urethane(meth)acrylate-derived material obtained from Preparation Example 1 is scratched with a 3H pencil under a load of 1 kgf, and then the scratched site is contacted with a plasticizing solution containing a mixture of water and ethanol in a weight ratio of 1:2, for each of the times shown in the following Table 2. The unabsorbed and remaining solution is removed and the self-healing time after being scratched is measured. The results are shown in the following Table 2.

TABLE 2

|  | Contact time of plasticizing solvent | Self-healing time (minute) |
|---|---|---|
| Comparative Example 1 | 0 | 60 |
| Example 7 | 30 seconds | 30 |
| Example 8 | 1 minute | 20 |
| Example 9 | 5 minutes | 20 |
| Example 6 | 10 minutes | 20 |
| Example 10 | 15 minutes | 30 |

Referring to Table 2, it is confirmed that the self-healing time is shortened to only 30 minutes even in the case of contacting the plasticizing solvent for only 30 seconds, and it is also shortened until about 20 minutes when contacted for greater than or equal to 1 minute and less than or equal to 10 minutes.

Example 11

The self-healing time is measured in accordance with the same procedure as in Example 6, except that a cloth which has absorbed the plasticizing solvent is attached to the scratched site instead of dripping the plasticizing solvent. The plasticizing solvent is a mixture of water and ethanol in a weight ratio of 1:2. The results show that the self-healing time of the scratched site is 20 minutes. Thereby, it is understood that both a method of directly contacting the plasticizing solvent with the scratched site and a method of attaching a cloth in which the plasticizing solution is absorbed onto the scratched site, are both effective at shortening the self-healing time.

Example 12

In Example 6, the plasticizing solvent is contacted with the scratched site, and then the healing time of the scratched site is measured while contacting the plasticizing solvent without removing the remained plasticizing solvent. The results show that the self-healing time is 40 minutes. Thereby, it is understood that the removing the remaining plasticizing solvent is more effective at accelerating self-healing than the case of not removing the remained plasticizing solvent.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method of accelerating self-healing, comprising:
    contacting a scratched portion of a self-healing urethane(meth)acrylate-derived material with a plasticizing solvent,
    wherein the plasticizing solvent comprises water, an alcohol, a ketone, or a combination thereof.

2. The method of claim 1, wherein the contacting of the scratched portion of the self-healing urethane(meth)acrylate-derived material with the plasticizing solvent comprises:
    dripping the plasticizing solvent on the scratched portion,
    attaching a material in which the plasticizing solution is absorbed to the scratched portion, or
    dipping the scratched portion in the plasticizing solvent.

3. The method of claim 1, wherein a scratch in the scratched portion is self-healed in about 10 seconds to about 72 hours.

4. The method of claim 1, wherein the method of accelerating self-healing comprises contacting the scratched portion of the self-healing urethane(meth)acrylate-derived material with the plasticizing solvent for about 10 seconds or longer.

5. The method of claim 1, further comprising removing the plasticizing solvent remaining in the scratched portion after contacting the scratched portion of the self-healing urethane(meth)acrylate-derived material with the plasticizing solvent.

6. The method of claim 5, wherein a scratch in the scratched portion is self-healed in less than or equal to about 12 hours after removing the plasticizing solvent.

7. The method of claim 1, wherein a scratch in the scratched portion is formed by a pencil having a hardness of 4B to 9H at a load of 1 kilogram-force.

8. The method of claim 1, wherein the self-healing urethane(meth)acrylate-derived material is a cured product of a self-healing composition comprising a urethane(meth)acrylate compound.

9. The method of claim 8, wherein the urethane(meth)acrylate compound has two (meth)acrylate groups and six or more urethane groups.

10. The method of claim 9, wherein the urethane(meth)acrylate compound is a reaction product of a C1 to C20 aliphatic diisocyanate, a C1 to C100 aliphatic diol, and a C1 to C20 hydroxyalkyl(meth)acrylate.

11. The method of claim 9, wherein the urethane(meth)acrylate compound is represented by Chemical Formula 1:

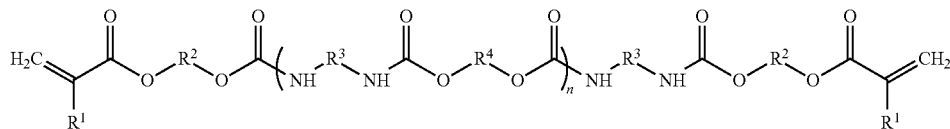

Chemical Formula 1 wherein, in Chemical Formula 1, n is a numeral of 2 to 30, $R^1$ is hydrogen or a methyl group, $R^2$ and $R^3$ are each independently a substituted or unsubstituted C1 to C20 alkylene group, or a substituted or unsubstituted C3 to C20 cycloalkylene group, and $R^4$ is a substituted or unsubstituted C1 to C10 alkylene or a C2 to C100 divalent functional group comprising an ether group, an ester group, or a combination thereof.

12. The method of claim 8, wherein the self-healing composition further comprises a polyhedral oligomeric silsesquioxane.

13. The method of claim 12, wherein the polyhedral oligomeric silsesquioxane is a polyhedral oligomeric silsesquioxane substituted with a phenyl group.

14. The method of claim 12, wherein an amount of the polyhedral oligomeric silsesquioxane is about 0.1 weight percent to about 20 weight percent, based on a total solid content of the self-healing composition.

15. The method of claim 1, wherein the self-healing urethane(meth)acrylate-derived material is in a film form.

16. The method of claim 15, wherein the film has a thickness of about 10 micrometers to about 500 micrometers.

17. The method of claim 15, wherein the self-healing urethane(meth)acrylate-derived material is a protective film disposed on a surface of a device.

18. The method of claim 17, wherein the protective film further comprises an anti-fingerprinting coating layer disposed on at least one surface of the protective film.

19. The method of claim 17, wherein the self-healing urethane(meth)acrylate-derived material has a light transmittance of greater than or equal to about 80%, a yellowness index of less than or equal to about 3, and a haze of less than or equal to about 5%.

20. The method of claim 17, wherein the self-healing urethane(meth)acrylate-derived material is a protective film on a surface of a window of a flexible display device.

* * * * *